United States Patent
Kampshoff et al.

(10) Patent No.: US 9,465,139 B2
(45) Date of Patent: Oct. 11, 2016

(54) METHOD FOR MONITORING SEAFLOOR MOVEMENTS

(76) Inventors: Stefan Kampshoff, Assen (NL); Hanno Klemm, Rijswijk (NL)

(*) Notice: Subject to any disclaimer, the term of this patent is extended or adjusted under 35 U.S.C. 154(b) by 417 days.

(21) Appl. No.: 14/116,237

(22) PCT Filed: May 10, 2012

(86) PCT No.: PCT/EP2012/058615
§ 371 (c)(1),
(2), (4) Date: Nov. 7, 2013

(87) PCT Pub. No.: WO2012/152858
PCT Pub. Date: Nov. 15, 2012

(65) Prior Publication Data
US 2014/0095075 A1    Apr. 3, 2014

(30) Foreign Application Priority Data
May 11, 2011  (EP) .................................. 11165607

(51) Int. Cl.
*G01V 9/00* (2006.01)
*G01C 13/00* (2006.01)
*G01V 7/00* (2006.01)

(52) U.S. Cl.
CPC .............. *G01V 9/00* (2013.01); *G01C 13/008* (2013.01); *G01V 7/00* (2013.01)

(58) Field of Classification Search
CPC .......... G01C 13/008; G01V 9/00; G01V 7/00
USPC ....... 702/2, 5; 367/21, 15, 75, 153; 181/122, 181/401, 110, 112; 405/166, 158
See application file for complete search history.

(56) References Cited

U.S. PATENT DOCUMENTS

| | | | | |
|---|---|---|---|---|
| 4,807,199 A | * | 2/1989 | Yamamoto | G01V 1/38 367/15 |
| 4,951,264 A | * | 8/1990 | Yamamoto | G01V 1/284 181/122 |
| 5,804,715 A | * | 9/1998 | Bennett | E21B 47/06 73/170.32 |
| 6,024,344 A | * | 2/2000 | Buckley | G01V 1/3852 181/110 |

(Continued)

FOREIGN PATENT DOCUMENTS

| | | |
|---|---|---|
| CN | 1790017 | 6/2006 |
| WO | 0142818 A1 | 6/2001 |

(Continued)

OTHER PUBLICATIONS

PCT International Search Report, Application No. PCT/EP2012/058615 dated Jul. 24, 2012.

(Continued)

*Primary Examiner* — Carol S Tsai

(57) ABSTRACT

Seafloor movements are monitored by measuring the ambient seawater pressure at a plurality of locations adjacent to the seafloor using asynchronous pressure signals generated by a plurality of pressure sensors mounted at different locations on the seafloor over a prolonged period of time(t), wherein harmonic tide-related pressure variations on the asynchronous pressure signals are corrected by an algorithm comprising a mathematical equation that models spatial and temporal pressure variations in an objective function. The method is unconstrained with regard to the synchronicity of depth and/or pressure measurements and does not require additional stationary short tem local reference measurements.

15 Claims, 1 Drawing Sheet

(56) References Cited

U.S. PATENT DOCUMENTS

| | | | |
|---|---|---|---|
| 6,501,704 B2* | 12/2002 | Nishimura | B63C 11/48 367/118 |
| 6,704,244 B1* | 3/2004 | Vaage | G01V 1/36 181/110 |
| 6,813,564 B2 | 11/2004 | Eiken et al. | |
| 6,903,998 B2* | 6/2005 | Vaage | G01V 1/36 181/110 |
| 7,104,128 B2* | 9/2006 | Inglese | G01P 15/08 73/514.01 |
| 7,328,108 B2* | 2/2008 | Robertsson | G01V 1/364 702/17 |
| 7,558,154 B2* | 7/2009 | Van Manen | G01V 1/364 367/43 |
| 7,778,108 B2* | 8/2010 | Van Manen | G01V 1/364 367/15 |
| 8,579,545 B2* | 11/2013 | Jewell | F16L 1/16 405/158 |
| 8,621,922 B2* | 1/2014 | Den Boer | G01O 5/06 73/170.29 |
| 2002/0064092 A1* | 5/2002 | Nishimura | B63C 11/48 367/128 |
| 2003/0093222 A1* | 5/2003 | Eiken | G01C 13/00 702/5 |
| 2005/0073909 A1* | 4/2005 | Laws | G01V 1/201 367/15 |
| 2005/0169713 A1* | 8/2005 | Luc | G01V 1/38 405/166 |
| 2006/0253256 A1* | 11/2006 | Robertsson | G01V 1/364 702/14 |
| 2007/0002688 A1* | 1/2007 | Van Manen | G01V 1/364 367/14 |
| 2008/0294347 A1* | 11/2008 | Robertsson | G01V 1/364 702/17 |

FOREIGN PATENT DOCUMENTS

| | | |
|---|---|---|
| WO | 2008087174 A2 | 7/2008 |
| WO | 2010037726 A2 | 4/2010 |

OTHER PUBLICATIONS

"Nemo Net", NOAA's Pacific Marine Environmental Laboratory, Dec. 30, 2006, Retrieved from the Internet: URL:http://www.pmel.noaa.gov/vents/nemo/realtimej.

* cited by examiner

METHOD FOR MONITORING SEAFLOOR MOVEMENTS

PRIORITY CLAIM

The present application which is a 371 application of PCT/EP2012/058615, filed May 10, 2012, claims priority from European Application 11165607.0, filed May 11, 2011.

BACKGROUND OF THE INVENTION

The invention relates to a method for monitoring seafloor movements.

Such a method is known from U.S. Pat. No. 6,813,564.

This prior art reference discloses a method for monitoring possible subsidence of a surveyed seafloor area, that may be caused by compaction of an underground hydrocarbon reservoir, comprising the following steps:

conducting at least two measurement series ($S_1 \ldots, S_i, \ldots, S_m$) each comprising at least one time-indexed depth measurement, with a separation in time between the measurement series on the order of months or years;

conducting each depth measurement on a survey station arranged on a benchmark having fixed vertical and horizontal position relative to the local seafloor;

within each measurement series ($S_i$), conducting at least one stationary time-indexed short-time local reference depth measurement series on at least one short-term local reference station on at least one benchmark, for correcting each depth measurement for short-time (e.g. tidal) depth variations; and conducting the depth measurements relative to at least one depth measurement at a reference station arranged on the seafloor outside the survey area at least once during each measurement series ($S_i$), the reference station essentially being unaffected by long-term effects taking place due to compaction in the reservoir during the series of measurements ($S_1 \ldots, S_i, \ldots, S_m$).

The method known from U.S. Pat. No. 6,813,564 therefore relies on the use of an 'extra' stationary time indexed short-time local reference depth measurement series on a local reference station.

In this known approach, existing autonomous long-term sensors carry out pressure measurements asynchronously to each other, but in-sync with a stationary short-time (quasi-continuous) local depth/pressure sensor. This does allow for a correction of the asynchronous long-term sensor measurements for-short term depth/pressure variations. Subsequently, tide-free relative heights can be derived by differencing pressures with respect to the short-term local reference station.

There is a need for an improved method for monitoring seafloor subsidence which is unconstrained with regard to the synchronicity of depth and/or pressure measurements and not require additional stationary short term local reference measurements.

SUMMARY OF THE INVENTION

In accordance with the invention there is provided a method for monitoring seafloor movements by measuring the ambient seawater pressure at a plurality of locations adjacent to the seafloor using asynchronous pressure signals generated by a plurality of pressure sensors mounted at different locations on the seafloor over a prolonged period of time (t), wherein harmonic tide-related pressure variations on the asynchronous pressure signals are corrected by an algorithm comprising a mathematical equation that models spatial and temporal pressure variations in an objective function. The mathematical equation to model spatial and temporal pressure variations may be given by:

$$p(t, x) = A_0(x, t) + A_T(t) + \sum_{k=1}^{M} A_k \sin(\omega_k t + \Phi_k),$$

wherein x denotes the locations of the sensors, $A_0$ denotes a depth dependent offset which depends on location, $A_T$ denotes long-time or non-oscillatory variations, and the oscillatory terms $$\sum_{k=1}^{M} A_k \sin(\omega_k t + \Phi_k)$$

are determined by the amount M of tidal cycles k over the prolonged period of time(t), wherein $\omega_k$ denotes frequencies of the tidal cycles, which are dictated by the motion of the earth with respect to the moon and the sun, and $\Phi_k$ denotes phases of the tidal cycles that are associated with the location of the area in question.

This mathematical equation is a model for temporal and spatial pressure variations.

The model has a few free parameters, namely $A_0, A_T, A_k$, and $\Phi_k$, where (k=1, . . . , M).

Given the availability of some data, we can use a non linear least squares algorithm to estimate optimal values for these free parameters by minimising the misfit between the model predictions and the actual values of the measurements.

The objective function S, that is minimized by the non linear least squares method, may be expressed as:

$$S = \sum_{j} (p_i^j - A_0^j) - \sum_{k=1}^{m} A_k \sin(\omega_k t_i + \Phi_k)$$

where the subscript i denotes distinct measurement times.

This objective function S may be minimised by the non-linear least squares algorithm by varying the A's and $\Phi$'s and by identifying a value of S that is as low as possible. Furthermore, a combination of asynchronous pressure signals generated by all pressure sensors may be used to estimate the harmonic tide-related pressure variations in the algorithm.

Optionally, non-vertical movements of the seafloor may monitored by measuring distances between the pressure sensors at selected intervals of time throughout the prolonged period of time(t), which distances may be measured by a time of flight measurement of wireless signals, such as acoustic, electromagnetic and/or photonic signals, transmitted by a wireless signal transmitter connected to one of the pressure sensors to wireless signal receivers connected to each of the other pressure sensors.

The pressure sensors and/or wireless signal transmitters and receivers may be mounted on tripods which are mounted on or at least partly penetrate into the seafloor and the method according to the invention may be used to monitor seafloor movements above a hydrocarbon containing formation from which hydrocarbons are produced and may furthermore be used to manage, optimize and/or otherwise control the production of hydrocarbons from the formation.

In such case the method according to the invention may be used to take into account contraction and/or expansion of the hydrocarbon containing formation in a mathematical reservoir model, which calculates the flux of hydrocarbon and other fluids through the hydrocarbon containing formation and which mathematical reservoir model is used to manage, optimize and control the production of hydrocarbon fluid from and/or the injection of production stimulation fluids into the hydrocarbon containing formation.

These and other features, embodiments and advantages of the method according to the invention are described in the accompanying claims, abstract and the following detailed description of non-limiting embodiments depicted in the accompanying drawings, in which description reference numerals are used which refer to corresponding reference numerals that are depicted in the drawings. Similar reference numerals in different figures denote the same or similar objects.

DETAILED DESCRIPTION OF THE DEPICTED EMBODIMENTS

Figure 1:
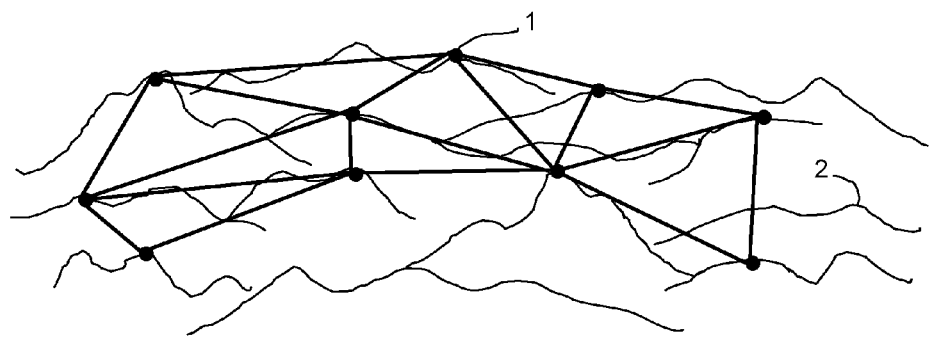
FIG. 1 shows an array of pressure sensors mounted at the seafloor.

FIG. 1 schematically illustrates an array of pressure sensors 1 that are mounted at the seafloor 2.

Figure 2:
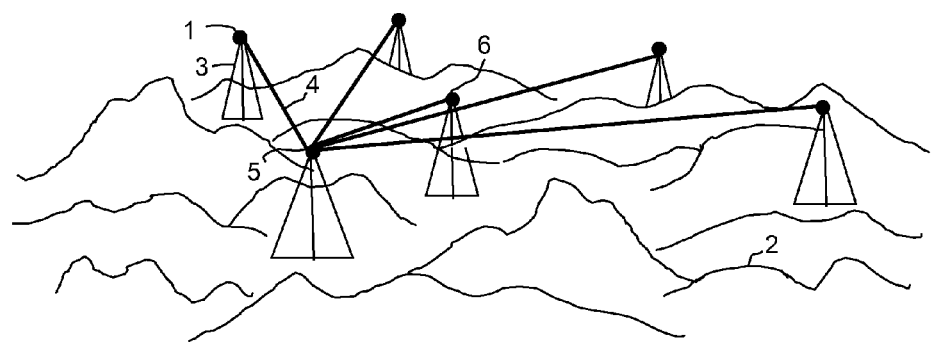
FIG. 2 shows in more detail than FIG. 1 how the array of pressure sensors is mounted on tripods at the seafloor.

FIG. 2 shows how the pressure sensors 1 are each mounted on a tripod 3 of which the legs at least partly penetrate the seafloor 2 and how the distances between the pressure sensors 1 are measured by obtaining time of flight information of acoustic, electromagnetic, photonic and/or other wireless signals 4 transmitted periodically by a wireless signal transmitter 5 mounted at one tripod 3 to wireless signal receivers 6 mounted at the other tripods 3.

It will be understood that the seafloor may be the bottom of a sea, fjord, ocean, lake or any other body of water which is subject to tidal depth variations.

It will also be understood that the seafloor may move in vertical and horizontal directions as a result of tectonic effects, such as earthquakes, and as a result of production of hydrocarbon fluids from an underlying hydrocarbon fluid containing formation.

Subsidence information over hydrocarbon reservoirs can provide valuable insight in compartmentalization, and reservoir performance. Onshore, various methods exist, to measure subsidence at millimeter accuracy. However, obtaining precise subsidence measurements offshore proves significantly more challenging.

The main obstacle to extending onshore technologies offshore, is given by the fact that onshore measurements rely either heavily on electromagnetic waves, or survey crews in the field. Electromagnetic radiation is almost instantly attenuated offshore, and survey crews are unfeasible, as well.

The common technology used for bathymetry measurements are sonar measurements, which have usually a cited accuracy of 20-80 cm. Their repeatability might be slightly better, but is still in the centimeter range. Centimeter repeatability is sufficient if we are trying to monitor a highly compacting reservoir, but are not sufficient if the effect we are interested in is itself in the order of a few centimeters, at most. In order to overcome this problem, we have investigated the possibility of repeat pressure measurements by autonomous subsea sensors.

The main challenge to derive subsidence from pressure measurements is to disentangle subsidence signals from pressure changes due to tides and atmospheric pressure fronts.

In accordance with the invention there is provided a method to fit a tidal model to a data set that is sampled irregularly in time. This method cannot take out the atmospheric pressure changes, but by looking at relative pressure changes, these highly correlated signals can be taken out.

As a test data set, we have collected three years of pressure data over the Ormen Lange gas field offshore Norway. Ormen Lange is situated in 800-1200 m water depth. The test network consisted of ten sensors, deployed over an area of 2 km$^2$. As the primary objective of the trial was to trial repeated range measurements, we decided not to deploy offshore reference stations, which prove to be a significant limiting factor to the interpretability of the results.

In this description a distinction is made between accuracy and repeatability. Accuracy is defined to be a measure of how close the actual measurement value is to the measured quantity. E.g. an accuracy of 10 cm means that (within a certain confidence level) the actual value of the measured quantity is within 10 cm of the quoted value. Repeatability is defined to be a measure how well we can repeat a measurement. Thus, if we have a method of calibrating two repeat measurements, the repeatability might be higher than the accuracy, if we can repeat our mistakes well. For time-lapse monitoring, the accuracy of a measurement is of little consequence, we are interested in the repeatability, as we are interested in changes due to hydrocarbon production.

We assume that we have a network of n pressure sensors at the seafloor.

Each of the sensors, labeled by $j=\{1, \ldots, n\}$ samples the pressure at its depth. In total we have K measurements at times $t_i$, $i=\{1, \ldots, K\}$. We do not assume that all sensors sample the pressures at the same time.

Furthermore it is assumed that the pressure field at the seafloor can be described in the following Equation 1 as:

$$p(t, x) = A_0(x, t) + A_T(t) + \sum_{k=1}^{M} A_k \sin(\omega_k t + \Phi_k), \quad \text{[Equation 1]}$$

where t=time, x=location, $A_0$ denotes a depth dependent offset, $A_T$ denotes long-time or non-oscillatory variations, and the oscillatory terms $$\sum_{k=1}^{M} A_k \sin(\omega_k t + \Phi_k)$$

are determined by the amount M of tidal cycles k, wherein $\omega_k$ denote different fundamental frequencies, dictated by the motion of the earth with respect to the moon and the sun, $A_k$ denotes tidal amplitudes at the location of the area in question, and $\Phi_k$ the phase of the tidal cycles at this location.

In the model according to Equation 1, it is assumed that only $A_0$ depends on the location, in particular this implies we assume the tidal pressure variations as constant magnitude over the area of interest. In particular, this model has only one unknown parameter that is location (and thus sensor) dependent, namely $A_0$.

At this point, $A_0$ looks quite intractable. It has an unknown dependence of depth and of time. To simplify matters, we now assume, that the only temporal change in $A_0$ is given by changes in the seafloor location, thus by subsidence (or uplift). Then, it can be assumed that the temporal change in $A_0$ is a slow process compared to all other time scales in Equation [1].

If we therefore take a sufficiently short interval of data, we can assume $A_0$ to be constant in time, and only be dependent on depth. This provides the following steps for a strategy to obtain subsidence estimates from the obtained asynchronous pressure data:

1. From a sufficient interval of the pressure data, estimate the free parameters $A_0$, $A_k$, $\Phi_k$;
2. Declare one pressure sensor as a reference station;
3. By looking at the differences between the reference sensor and the other sensors, $A_T$ is eliminated from the problem;
4. Then the above steps 1, 2 and 3 are repeated for all possible time intervals and thus obtain a time series for the (sensor dependent) time-series $A_0^j$ for all sensors $j = \{1, \ldots, n\}$.
5. Finally, the pressure values are converted to depth values by using the usual pressure gradient of water, assuming that the density of sea water is 1025 kg/m³, the pressure gradient is 10.05 kPa/m or (to a good approximation) 1 kPa/10 cm.

As can be seen from the above description of steps 1-5, we assume only the phases $\Phi$ for the tidal data to be variable, not the frequencies $\omega$. The tidal frequencies $\omega$ can be very well calculated from astronomical data, and we therefore hold them fixed. Of course, a high precision tidal model needs highly accurately and high frequently sampled data over years. However, the dominant frequencies $\omega$ have relatively short cycles of a few hours to a few days.

By comparing results of different time intervals, we decided finally on estimating one set of parameters from two week intervals of data. This seemed to give a good balance between estimating the dominant tidal modes over these two week intervals, and providing a sufficiently robust method of subtracting $A_T$.

In the following section, the implementation of the method according to the present invention is described in more detail.

The pressure data that we have at our disposal has been sampled from ten sensors every three hours, however not necessarily at the same points in time. We decided to estimate the parameters of the tidal model, as well as the offsets with two week intervals of data. We chose them overlapping by one week.

The sampled pressure data is assumed to have the form $p^j(t_{ij}) = p(x_j, t_{ij}) + \epsilon$, where the noise term $\epsilon$ is assumed to be independently normally distributed with zero mean, $\epsilon \sim N(0, \delta^2)$. Under this assumption, a least squares method to estimate the model parameters can be used.

The relevant tidal frequencies are linear combinations of the following fundamental frequencies:
T=15°/hr: Rotation of the earth on it's axis relative to the sun
h=0.04106864°/hr: Rotation of the earth about the sun
s=0.54901653°/hr: Rotation of the moon about the earth
$p_p$=0.00464183°/hr: Precession of the moon's perigee
$N_n$=−0.00220641°/hr: Precession of the plane of the moon's orbit After some experimentation, we decided to include the following tidal frequencies for the tidal model
$M_2$=2T−2s+2h=28.984°/hr: Principal lunar semi-diurnal constituent
$S_2$=2T=30.000°/hr: Principal solar semi-diurnal constituent
$N_2$=2T−3s+2h+pp=28.440°/hr: Larger lunar elliptic semi-diurnal constituent
$K_1$=T+h=15.041°/hr: Luni-solar declinational diurnal constituent
$O_1$=T−2s+h=13.943°/hr: Lunar declinational diurnal constituent
$\nu_2$=2T−3s+4h−$p_p$=28.513°/hr: Modulation of $M_2$ to take deviations of the moon's orbit from an ellipse into account. (Larger lunar evectional constituent).
$K_2$=2T+2h=30.0823°/hr: Modulation of $M_2$ to convert the orbit of the moon from the earth's equator into the mean plane of the moon. (Lunisolar semi-diurnal constituent)
$P_1$=T−h=14.9593°/hr: Solar diurnal constituent.
$M_2$=2T−2s+2h
$N_2$=2T−3s+2h+$p_p$
$S_2$=2T
$L_2$=2T−s+2h−$p_p$
$K_1$=T+h
$O_1$=T−2s+h
$S_a$=h
$\nu_2$=2T−3s+4h−$p_p$
$K_2$=2T+2h
Mm=s−pp
$P_1$=T−h In some later processing runs, we decided to neglect the contributions of $S_a$, $\nu_2$ and $M_m$, because the solutions were unstable and oscillated between giving $S_a$ and some other contributions the most energy.

To estimate the best parameters, we used the pressure data from all sensors for a given time interval, and used the following objective function as Equation 2:

$$S = \sum_j (p_i^j - A_0^j) - \sum_{k=1}^{m} A_k \sin(\omega_k T_i + \Phi_k) \qquad \text{[Equation 2]}$$

As can be seen, by this method we simultaneously estimate the parameters using all available pressure data over a given time period. We do not include the parameter $A_T$ into the objective function. It would constitute just another linear term that would be indistinguishable from $A_0$, in the chosen representation. We eliminate $A_T$ in the final step of the method by referencing against one sensor. Using starting estimates for the parameters taken from the literature for the tidal model parameters and as the median of the pressure values for $A_0$, we use a library to provide us with a non-linear least squares solver, such as the library known as LAPACK, which is disclosed by E. Anderson et al in "LA-PACK Users' guide", 3rd edition as published by the Society for Industrial and Applied Mathematics, Philadelphia, Pa., USA, 1999 and NumPy as disclosed by J. T. Miller et al in NumPy: "Open source scientific computing package for Python" at url: http://www.numeric.scipy.org.

Application of Equations 1 and 2 in these libraries with non-linear linear least squares solvers generated subsidence data that proved repeatable after checking against subsidence data that were generated by another technique.

In the following section several features and benefits of the method according to the invention will be described in more generic terms than as described in the previous section.

Pressure (p) on the seafloor at position x, is a function of the height of the water column above the pressure sensor 1 at position x.

Due to tidal variation (s), pressure changes with time(t) can be expressed by the formula:

$$p(x,t)=p_0(x)+s(x,t).$$

Over an area of limited extend, the tidal variations can be assumed laterally constant: $s(x,t)=s(t)$. Let us now denote a pressure measurement $p(x_i,t)$ at location $x_i$ as $p^i(t)$.

Relative pressure differences $p^i(t_k)-p^j(t_l)$ derived from asynchronous pressure measurements at different locations i,j and observation times k,l will be perturbed by differential tidal signal $s(t_k)-s(t_l)$ with:

$$p^i(t_k)-p^j(t_l)=p_0^i-p_0^j+s(t_k)-s(t_l).$$

Limited long-term clock stability and other operational issues prevented recent attempts to eliminate $s(t_k)-s(t_l)$ by fully synchronizing long-term autonomous pressure sensors.

It is observed that the depth measurement method known from U.S. Pat. No. 6,813,564 relies on the use of an 'extra' stationary time indexed short-time local reference depth measurement series on a local reference station. In this known approach, existing autonomous long-term sensors carry out pressure measurements asynchronously to each other, but in-sync with a stationary short-time (quasi-continuous) local depth/pressure sensor. This does allow for a correction of the asynchronous long-term sensor measurements for-short term depth/pressure variations. Subsequently, tide-free relative heights can be derived by differencing pressures with respect to the short-term local reference station.

In accordance with the invention there is provided a novel approach to derive tide-free relative height differences from asynchronous seafloor pressure measurements.

The novel approach according to the invention is unconstrained with regard to the synchronicity of depth/pressure measurements and in particular does not rely on 'extra' stationary short-term local reference measurements. Instead, harmonic short-term tide-related effects are corrected by a simultaneous estimation of:

the amplitude and phase parameters h of a harmonic model s(t,h) for the common tide-related pressure changes of all stations over time, and a constant pressure value $p_0^i$ per station, corresponding to the station depth.

Supplemented by a residual term taking into account the measurement noise of the pressure sensors, we obtain the observation equations of a non-linear least squares adjustment problem of the following form:

$$p^i(t)+(t)=e^i(t)=p_0^i+s(t,h).$$

It is then assumed that the noise is normally distributed with mean zero and variance $\sigma^2$, $e \sim N(0, \sigma^2)$. The harmonic tidal model is subsequently expressed as:

$$s = \sum_{n=1}^{k} A_n \cos(\omega_n t + \varphi_n).$$

Here, $A_n$ are the amplitudes of the components, $\omega_n$ the frequencies and $\varphi_n$ the phases, thus $h=(A_n, \omega_n, \varphi_n)$.

The accuracy of the tidal model is determined by how many terms the harmonic series comprises. In order to constrain the estimation problem further, the frequencies $\omega_n$ can also be seen as given. The described simultaneous estimation process is done over an adequate period of time determined by:

the expected subsidence rates of the stations (the assumption of a constant $p_0^i$ must be valid over this period), the frequency of the pressure measurements at the asynchronous transponders; and the frequencies of the harmonic model.

With regard to the required frequency of the pressure measurements it should be noted that the combination of all sensors is used to estimate the common pressure model. Thus, the more asynchronous the pressure measurements are, the better the temporal sampling of the common harmonic pressure model will be.

Besides tidal variations, the common pressure changes in time might include other (residual) short-term signals that correspond to e.g. weather changes or similar non-periodic phenomena. As the harmonic pressure model is not able to capture these signals, they do have the potential to perturb the co-estimated station pressures/depths. We do however assume, that the described short-term residuals can be modelled by a non-periodic, but temporally correlated stochastic signal with a zero mean.

Complementary to the above named criteria, the analysis time window is therefore also determined by the validity of the above assumption whilst taking into account that the time window must be chosen sufficiently long to average out any common short-term residual effects.

In order to remove additional common signals that are not estimated by the above approach, one can furthermore consider differences between pressure sensors, in order to obtain relative pressure, or depth changes.

Some salient aspects of the method according to the invention are summarized below:

In most pressure sensing based height-monitoring experiments a dedicated reference station is assumed. In the method according to the invention this is not necessary, but optional.

The formulation of the problem as simultaneously estimating a common pressure model and the offsets for each pressure sensor has never been attempted.

The method according to the invention circumvents the need for synchronous pressure measurements.

To the contrary, asynchronous pressure measurements are preferred to obtain better estimates of the tidal model as expressed by equations 1 and 2.

The invention claimed is:

1. A method for monitoring vertical seafloor movements by measuring the ambient seawater pressure at a plurality of locations adjacent to the seafloor comprising generating asynchronous pressure signals by a plurality of pressure sensors mounted at different locations on the seafloor over a prolonged period of time(t), and deriving tide-free relative height differences from the asynchronous pressure signals wherein the asynchronous pressure signals are corrected for harmonic tide-related pressure variations by an algorithm comprising a mathematical equation that models spatial and temporal pressure variations in an objective function and minimizing said objective function.

2. The method of claim 1, wherein the algorithm comprises the mathematical equation:

$$p(t, x) = A_0(x, t) + A_T(t) + \sum_{k=1}^{M} A_k \sin(\omega_k t + \Phi_k),$$

wherein x denotes the locations of the sensors, $A_0$ denotes a depth dependent offset which depends on location, $A_T$ denotes long-time or non-oscillatory variations, and the oscillatory terms:

$$\sum_{k=1}^{M} A_k \sin(\omega_k t + \Phi_k)$$

are determined by the amount M of tidal cycles k over the prolonged period of time(t), wherein $\omega_k$ denotes frequencies of the tidal cycles, which are dictated by the motion of the earth with respect to the moon and the sun, and $\Phi_k$ denotes phases of the tidal cycles that are associated with the location of the area in question.

3. The method of claim 2, wherein the algorithm further comprises a non-linear least squares algorithm to estimate the parameters $A_0$, $A_T$, $A_k$, and $\Phi_k$, where (k=1, . . . , M) solving the objective function S which is expressed as:

$$S = \sum_j (p_i^j - A_0^j) - \sum_{k=1}^{M} A_k \sin(\omega_k t_i + \Phi_k),$$

wherein the subscript $_i$ denotes distinct measurement times by applying the non-linear least squares algorithm whereby the objective function S is minimized by varying A and $\Phi$.

4. The method of claim 2, estimating the harmonic tide-related pressure variations in the algorithm with a combination of asynchronous pressure signals generated by all pressure sensors.

5. The method of claim 1, wherein monitoring non-vertical movements of the seafloor by measuring distances between the pressure sensors at selected intervals of time throughout the prolonged period of time(t).

6. The method of claim 5, wherein measuring the distances by a time of flight measurement of wireless signals transmitted by a wireless signal transmitter connected to one of the pressure sensors to wireless signal receivers connected to each of the other pressure sensors.

7. The method of claim 6, wherein the wireless signals comprise acoustic signals.

8. The method of claim 7, wherein the wireless signals comprise electromagnetic and/or photonic signals.

9. The method of claim 1, wherein the pressure sensors are mounted on tripods which are mounted on or at least partly penetrate into the seafloor.

10. The method of claim 1, wherein monitoring seafloor movements above a hydrocarbon containing formation from which hydrocarbons are produced.

11. The method of claim 10, wherein monitoring vertical and horizontal seafloor movements above the hydrocarbon containing formation and managing, optimizing and/or otherwise controlling the production of hydrocarbons from the formation based on the vertical and horizontal seafloor movements.

12. The method of claim 11, wherein monitoring contraction and/or expansion of the hydrocarbon containing formation in a geomechanical reservoir model based on the monitored seafloor movements.

13. The method of claim 12, wherein providing data from the geomechanical reservoir model as input to a mathematical reservoir model and calculating the flux of hydrocarbon and other fluids through the hydrocarbon containing formation with the mathematical model, and managing, optimizing and controlling of the production of hydrocarbon fluid from and/or the injection of production stimulation fluids into the hydrocarbon containing formation based on the mathematical reservoir model.

14. The method of claim 6, wherein the wireless signal transmitter and wireless signal receivers are mounted on tripods which are mounted on or at least partly penetrate into the seafloor.

15. The method of claim 14, wherein the pressure sensors are mounted on the tripods.

* * * * *